US012259811B2

(12) United States Patent
Jiang et al.

(10) Patent No.: US 12,259,811 B2
(45) Date of Patent: Mar. 25, 2025

(54) SOURCE CODE REPOSITORY DEBUG CHAINING

(71) Applicant: International Business Machines Corporation, Armonk, NY (US)

(72) Inventors: Peng Hui Jiang, Beijing (CN); Jun Su, Beijing (CN); Sheng Yan Sun, Beijing (CN); Hong Mei Zhang, Beijing (CN); Meng Wan, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 143 days.

(21) Appl. No.: 17/931,640

(22) Filed: Sep. 13, 2022

(65) Prior Publication Data
US 2024/0086306 A1    Mar. 14, 2024

(51) Int. Cl.
G06F 9/44 (2018.01)
G06F 11/362 (2025.01)
G06F 11/3698 (2025.01)

(52) U.S. Cl.
CPC ...... *G06F 11/3698* (2025.01); *G06F 11/3636* (2013.01)

(58) Field of Classification Search
CPC .......................... G06F 11/3664; G06F 11/3636
See application file for complete search history.

(56) References Cited

U.S. PATENT DOCUMENTS

| 9,946,631 | B1 | 4/2018 | Cook |
| 10,162,731 | B2 | 12/2018 | Barsness |
| 11,231,986 | B1* | 1/2022 | Silakov ................. G06F 11/079 |
| 2007/0220347 | A1* | 9/2007 | Kirtkow ............... G06F 11/3414 |
| | | | 714/E11.193 |
| 2008/0295114 | A1* | 11/2008 | Argade .................. G06F 9/485 |
| | | | 719/320 |
| 2014/0215443 | A1 | 7/2014 | Voccio |
| 2015/0052400 | A1* | 2/2015 | Garrett ................ G06F 11/3664 |
| | | | 714/37 |
| 2015/0150094 | A1 | 5/2015 | Foebel |
| 2016/0378637 | A1 | 12/2016 | Gamble |
| 2018/0129589 | A1* | 5/2018 | O'Dowd ................. G06F 17/40 |
| 2021/0311853 | A1* | 10/2021 | Shao .................. G06F 11/3604 |
| 2022/0383156 | A1* | 12/2022 | Harsola .................... G06N 5/04 |

FOREIGN PATENT DOCUMENTS

WO    2014189553 A1    11/2014

OTHER PUBLICATIONS

Dupriez et al., "Analysis and exploration for new generation debuggers", International Workshop on Smalltalk Technology IWST'17, Sep. 2017, 8 pages, <https://hal.archives-ouvertes.fr/hal-01585338>.
Fontana et al., "Mapping breakpoint types: an exploratory study", arXiv:2109.00917v2 [cs.SE] Nov. 11, 2021, 10 pages.
Petrillo et al., "Swarm Debugging: the Collective Intelligence on Interactive Debugging", Accepted Apr. 9, 2019, 23 pages, <https://www.sciencedirect.com/science/article/abs/pii/S0164121219300780?via%3Dihub>.
Yan et al., "Automated Breakpoint Generation for Debugging", Article in Journal of Software—Mar. 2013, 11 pages, <https://www.researchgate.net/publication/260320526>.

* cited by examiner

*Primary Examiner* — Hang Pan
(74) *Attorney, Agent, or Firm* — Randy Tejeda

(57) ABSTRACT

One or more computer processors generate a debug chain from one or more similar resource bound breakpoints, wherein the debug chain provides dynamic code flow. The one or more computer processors distribute the generated debug chain to one or more tenants.

20 Claims, 9 Drawing Sheets

SOURCE CODE REPOSITORY DEBUG CHAINING

BACKGROUND

The present invention relates generally to the field of source code repositories, and more particularly to building source code repository checkpoints.

A breakpoint is an intentional stopping or pausing place in a program for debugging purposes. More generally, a breakpoint is a means of acquiring knowledge about a program during its execution. During the interruption, the environment (general purpose registers, memory, logs, files, etc.) can be investigated to find out whether the program is functioning as expected. In practice, a breakpoint consists of one or more conditions that determine when a program's execution should be interrupted.

SUMMARY

Embodiments of the present invention disclose a computer-implemented method, a computer program product, and a system. The computer-implemented method includes one or more computer processors generating a debug chain from one or more similar resource bound breakpoints, wherein the debug chain provides dynamic code flow. The one or more computer processors distribute the generated debug chain to one or more tenants.

DETAILED DESCRIPTION

Source code repositories store large amounts of source code created by programmers, software developers, and designers (i.e., tenants) for retaining historical records of changes within sets of commit objects and sets of references to commit objects (i.e., heads). Repositories facilitate tenants with project development by allowing the submission of code in an efficient and organized manner. However, despite all the advantages traditional repositories provide tenants, said repositories are deficient in providing effective debug tools and methods. Traditional repositories do not incorporate debug techniques and methods (i.e., breakpoint placement, trace point pathing, etc.) utilized by tenants on local development machines and environments (e.g., integrated development environment (IDE)). Current repository implementations do not incorporate, store, nor distribute debug chains (i.e., breakpoints, trace point pathing, function calls).

Embodiments of the present invention allow for the generation and distribution of debug chains within source code repositories to one or more tenants. Embodiments of the present invention improve and expand software development through dynamic code flow (e.g., dynamically incorporating breakpoints on-the-fly as a tenant develops in real-time) with generated breakpoints based on current and historical developmental and debug activities. Embodiments of the present invention improve computational efficiencies within software development through breakpoint identification, classification, and distribution utilizing disparate source code repositories. Implementation of embodiments of the invention may take a variety of forms, and exemplary implementation details are discussed subsequently with reference to the Figures.

The present invention will now be described in detail with reference to the Figures.

Figure 1:
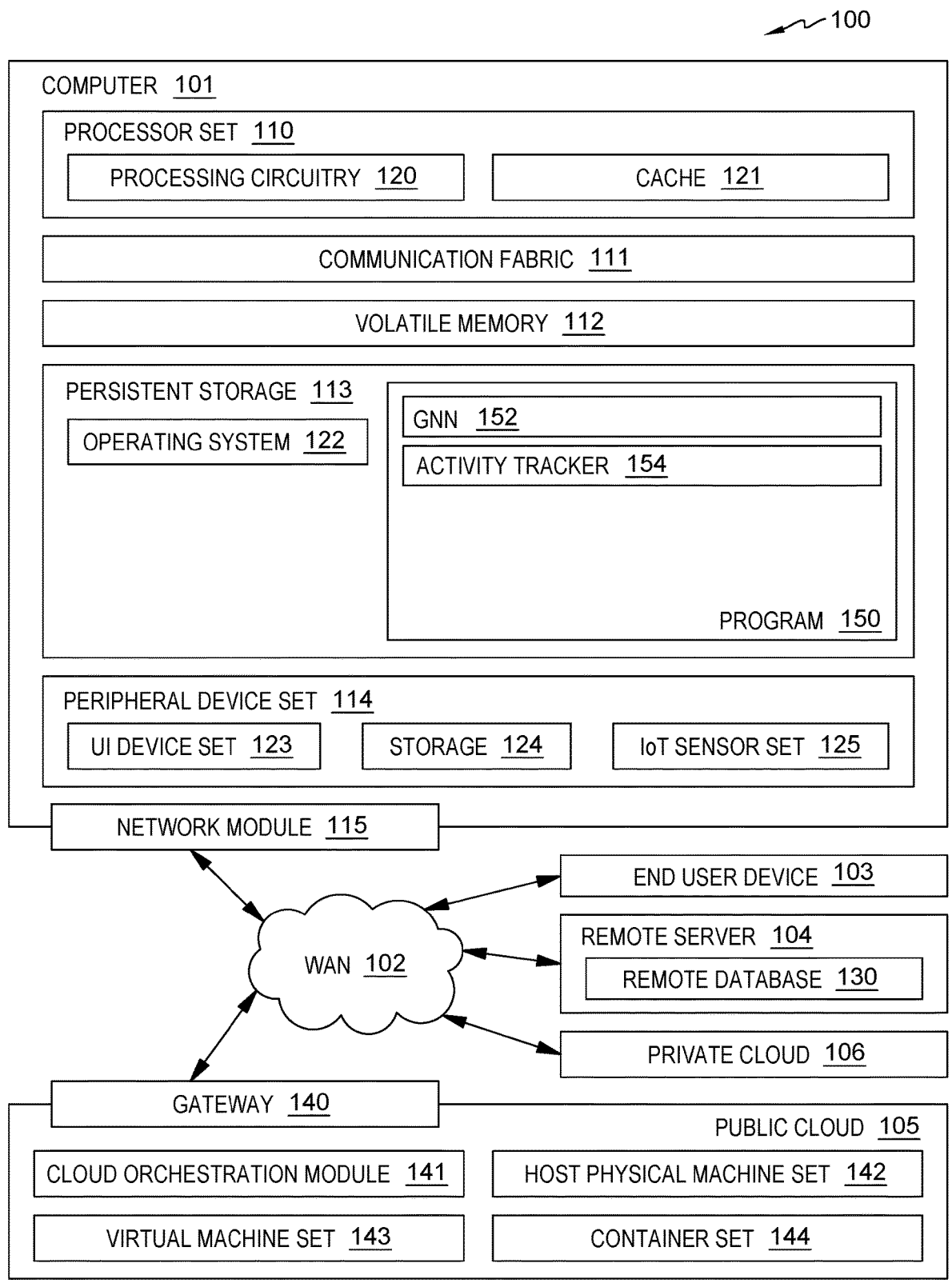
FIG. 1 is a functional block diagram illustrating a computing environment, in accordance with an embodiment of the present invention.

FIG. 1 depicts a block diagram of computing environment 100 illustrating components of computer 101 in accordance with an illustrative embodiment of the present invention. It should be appreciated that FIG. 1 provides only an illustration of one implementation and does not imply any limitations with regard to the environments in which different embodiments may be implemented. Many modifications to the depicted environment may be made.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, defragmentation, or garbage collection, but this does not render the storage device as transitory because the data is not transitory while it is stored.

Computing environment 100 contains an example of an environment for the execution of at least some of the computer code involved in performing the inventive methods, such as program 150. In addition to program 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and program 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network, or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 4. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip". In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in program 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in program 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images". A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Program 150 is a program for debug chain generation. In various embodiments, program 150 may implement the following steps: generate a debug chain from one or more similar resource bound breakpoints, wherein the debug chain provides dynamic code flow; and distribute the generated debug chain to one or more tenants. In the depicted embodiment, program 150 is a standalone software program. In another embodiment, the functionality of program 150, or any combination programs thereof, may be integrated into a single software program. In some embodiments, program 150 may be located on separate computing devices (not depicted) but can still communicate over wan 102. In various embodiments, client versions of program 150 resides on any other computing device (not depicted) within computing environment 100. In the depicted embodiment, program 150 includes GNN 152. Program 150 is depicted and described in further detail with respect to FIG. 2.

Graph neural network (GNN) 152 is representative of one or more models utilizing deep learning techniques to train, calculate weights, ingest metric graphs/metric blocks, and output a plurality of solution vectors (i.e., breakpoints and debug chain recommendation). In an embodiment, GNN 152 is a graph neural network or any deep learning methods designed to perform inference on data described by graphs. In another embodiment, GNN 152 is directly applied to graphs, providing node-level, edge-level, and/or graph-level prediction tasks (e.g., breakpoint identification, recommendation, and generation). In an embodiment, GNN 152 utilizes transferrable neural networks algorithms and models that can be trained with supervised or unsupervised methods. The training of GNN 152 is depicted and described in further detail with respect to FIG. 2.

Activity tracker 154 monitors and records debug activities from a plurality of tenants. Activity tracker 154 standardizes disparate debug interfaces between a plurality of tenants as well as between disparate source repositories of external debug environments and tools. In an embodiment, activity tracker 154 monitors basic debug features common with most processors and implementations, wherein the debug features include, but are not limited to, device identification, single stepping, breakpoints and watchpoints, and access to static memory and I/Os. In another embodiment, activity tracker 154 monitors debug activities related to processor execution trace, including real-time monitoring of process ownership and instruction tracing, complex watch points and branch tracking. In another embodiment, activity tracker 154 monitors for debug data, memory, inputs/outputs (I/O), and read/write instruction traces. In yet another embodiment, activity tracker 154 provides a tenant with direct control over the processor, for example, activity tracker 154 enables the execution of programs through memory substitution while providing for remapped memory and I/O ports by initiating a trace upon a watch-point occurrence.

The present invention may contain various accessible data sources that may include personal storage devices, data, content, or information the user wishes not to be processed. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Program 150 and activity tracker 154 provide informed consent, with notice of the collection of personal data, allowing the user to opt in or opt out of processing personal data. Consent can take several forms. Opt-in consent can impose on the user to take an affirmative action before the personal data is processed. Alternatively, opt-out consent can impose on the user to take an affirmative action to prevent the processing of personal data before the data is processed. Program 150 and activity tracker 154 enable the authorized and secure processing of user information, such as tracking information, as well as personal data, such as personally identifying information or sensitive personal information. Program 150 and activity tracker 154 provide information regarding the personal data and the nature (e.g., type, scope, purpose, duration, etc.) of the processing. Program 150 and activity tracker 154 provide the user with copies of stored personal data. Program 150 and activity tracker 154 allow the correction or completion of incorrect or incomplete personal data. Program 150 and activity tracker 154 allow the immediate deletion of personal data.

Figure 2:
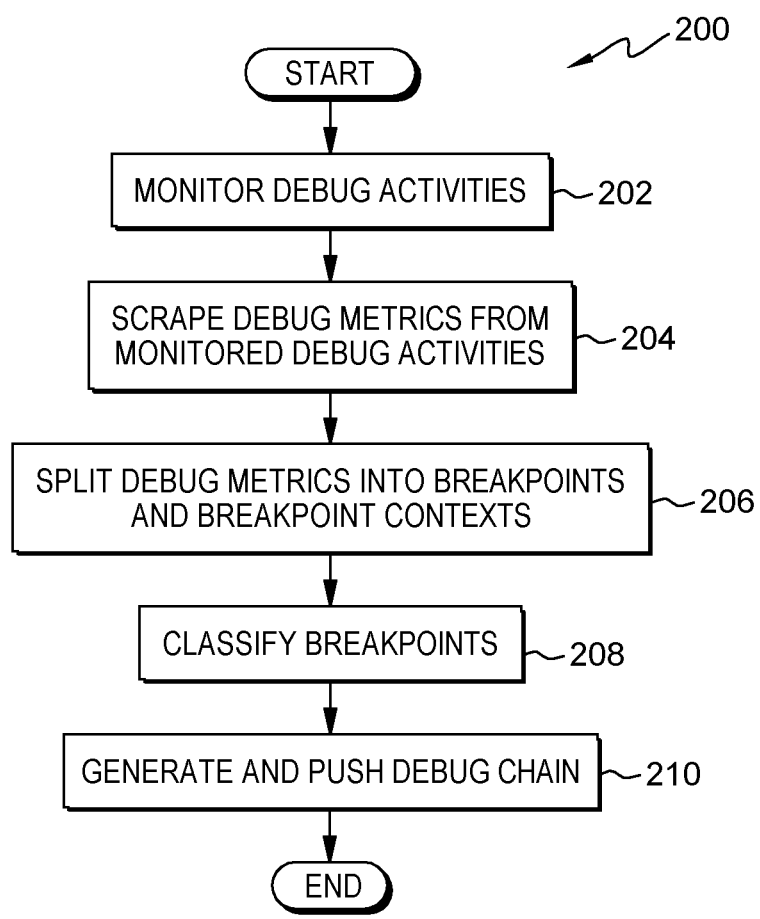
FIG. 2 is a flowchart depicting operational steps of a program, on a computer within the computing environment of FIG. 1, for debug chain generation, in accordance with an embodiment of the present invention.

FIG. 2 depicts flowchart 200 illustrating operational steps of program 150 for debug chain generation, in accordance with an embodiment of the present invention.

Program 150 monitors debug activities (step 202). In an embodiment, program 150 initiates responsive to one or more tenants (e.g., programmers, developers, bots, etc.) engaging in debug activities associated with one or more codebases and/or repositories. For example, program 150 initiates responsive to the execution of an integrated development environment (IDE) and begins monitoring the debug activities of the developers. In another example, program 150 initiates responsive to a pulled codebase from a code repository. In an embodiment, program 150 utilizes activity tracker 154 to monitor and record debug activities of a plurality of tenants while standardizing debug interfaces between said tenants. Activity tracker 154 monitors developer activities associated with debugging and problem diagnosis, such as device identification, lines and unconditionals, single stepping, breakpoints and watchpoints, static memory and I/Os. Activity tracker 154 and FIG. 3 further illustrate step 202.

Figure 4:
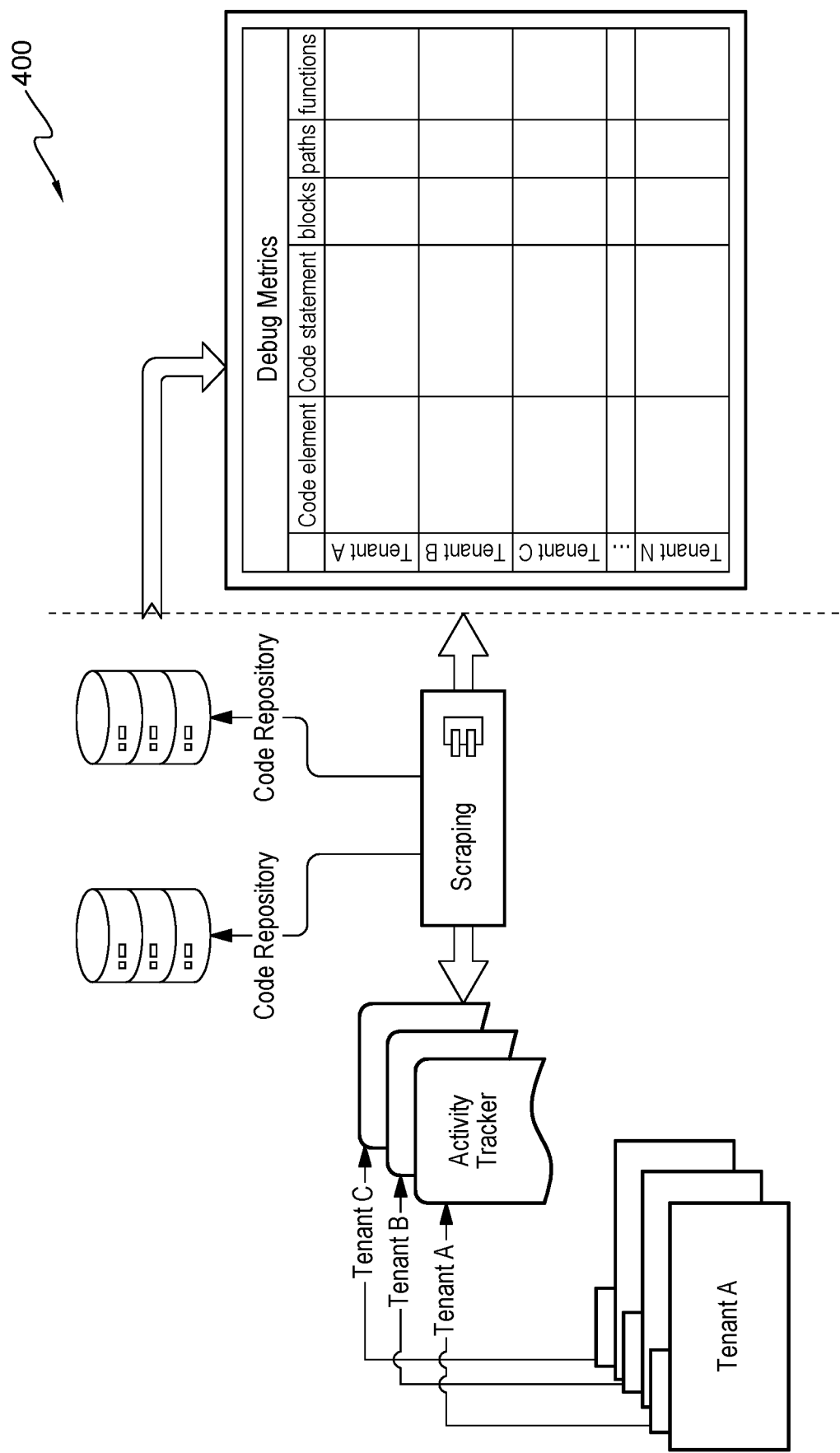
FIG. 4 is an illustration depicting debug scrapping, in accordance with an illustrative embodiment of the present invention.

Program 150 scrapes debug metrics from the monitored debug activities (step 204). In an embodiment, program 150 scrapes the monitored debug activities, from step 202, by aggregating debug activities into debug metrics based on the captured debug activities executed by the tenants. For example, program 150 creates debug metrics by aggregating debug activities by code element (i.e., statements, blocks, paths, functions, etc.). In this embodiment, program 150 tags code elements as suspicious or needing further review, which appear more often within failing test cases than passing test cases. In this embodiment, elements tagged as suspicious are not included in subsequent calculations. In a further embodiment, program 150 groups the debug metrics and associated tags based on a historical metric knowledge base (KB) containing historical debug metrics and associated classifications. In an embodiment, program 150 associates the scraped debug metrics with a source code repository. In this embodiment, program 150 groups the scraped debug metrics utilizing three orientations (i.e., tenant oriented, source code repository oriented, debug metric oriented). FIG. 4 further illustrates step 204.

Program 150 splits debug metrics into breakpoints and breakpoint contexts (step 206). In an embodiment, program 150 splits the scraped debug metrics into a plurality of breakpoints, associated breakpoint metrics, and breakpoint context metrics. In an embodiment, program 150 creates breakpoint metrics by extracting breakpoint properties from the scraped debug metrics. In this embodiment, breakpoint properties include, but are not limited to, id, action, location, condition, expressions, state data, status of evaluated expressions, stack information, etc.). In another embodiment, to further develop breakpoint context metrics, program 150 executes a set of test cases T on program P while collecting associated execution trace information (i.e., operating system interactions such as environment variables and utilized memory addresses).

Figure 5A:
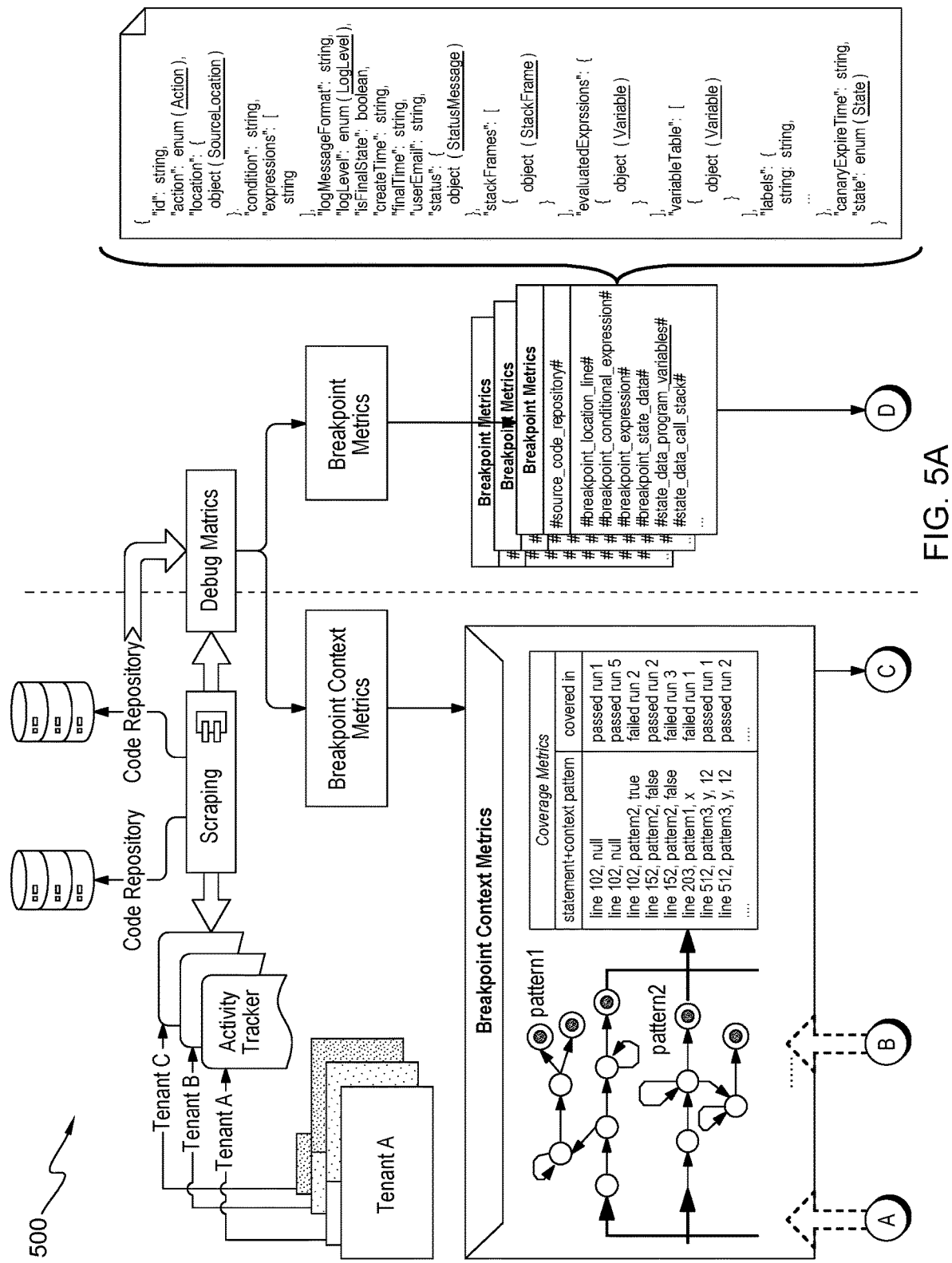
FIGS. 5A and 5B are illustrations depicting debug metric splitting, in accordance with an illustrative embodiment of the present invention.
Figure 5B:
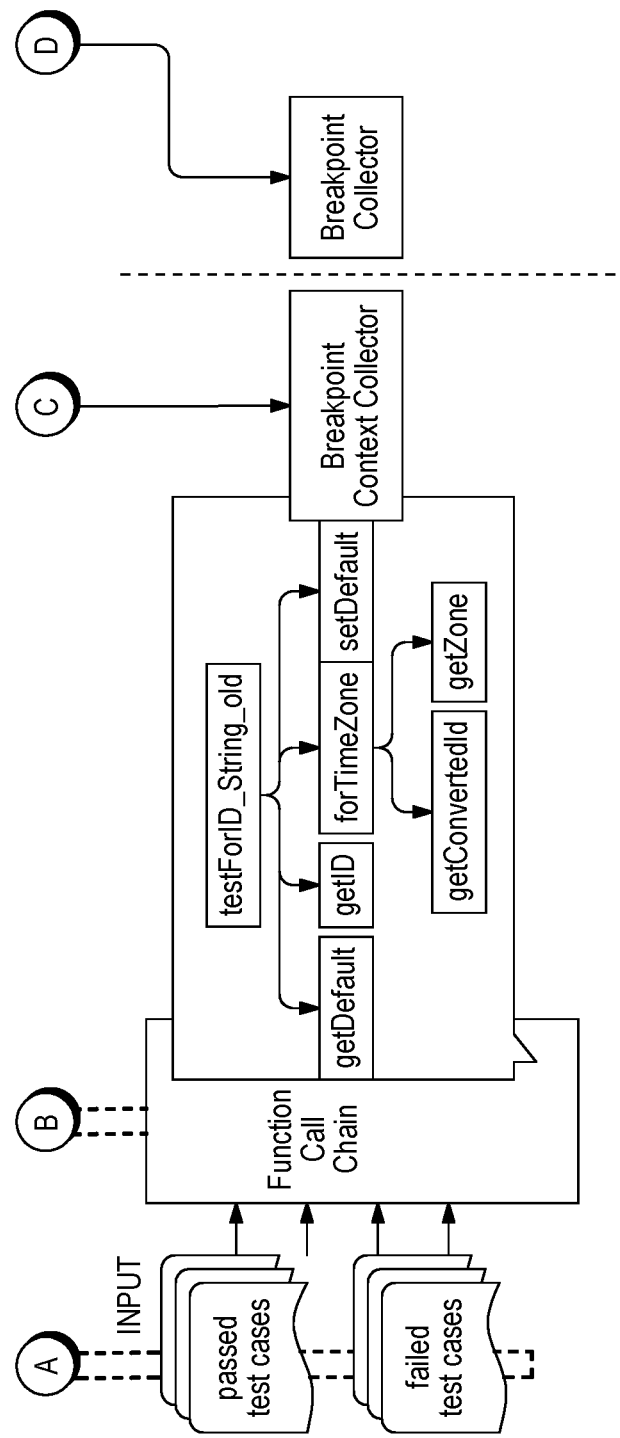

In an embodiment, program 150 collects and constructs breakpoint context metrics through the construction of a function call chain. In this embodiment, program 150 constructs the function call chain with a plurality of breakpoints, each associated with a score value. Here, program 150 utilizes the function call chain to identify breakpoint contexts associated with each breakpoint. In a further embodiment, program 150 creates the function call chain as follows: Let F be the set of functions in a program P, and T a set of test cases used to test P. Program 150 identifies a function call chain C, where C is a sequence of functions $f_1 \to f_2 \to \ldots \to f_n (f_i \in F)$ that occur during the execution of one or more test cases; i.e., $t \in T$. In a further embodiment, program 150 constructs $B^{ch}$, denoting a chain-based breakpoint matrix, wherein comprised rows represent test cases (elements of T), and columns contain call chains (elements of C). In this embodiment, $B^{ch}(i,j)=1$ signifies that a call chain $c_j$ will occur at least once in the execution of test case $t_i$. Responsive to the completion of one or more test cases, program 150 constructs a vector $R_{ch}$, denoting a test case execution result vector containing a record of outcomes of test runs within the breakpoint matrix, (e.g., pass (0) or fail (1)). In an embodiment, program 150 feeds a plurality of vectors $R_{ch}$ into a breakpoint collector and a breakpoint context collector that, respectively, collect and store a plurality of function call chains, associated vectors $R_{ch}$, and associated breakpoint metrics/contexts. FIGS. 5A and 5B further illustrate step 206.

Figure 6:
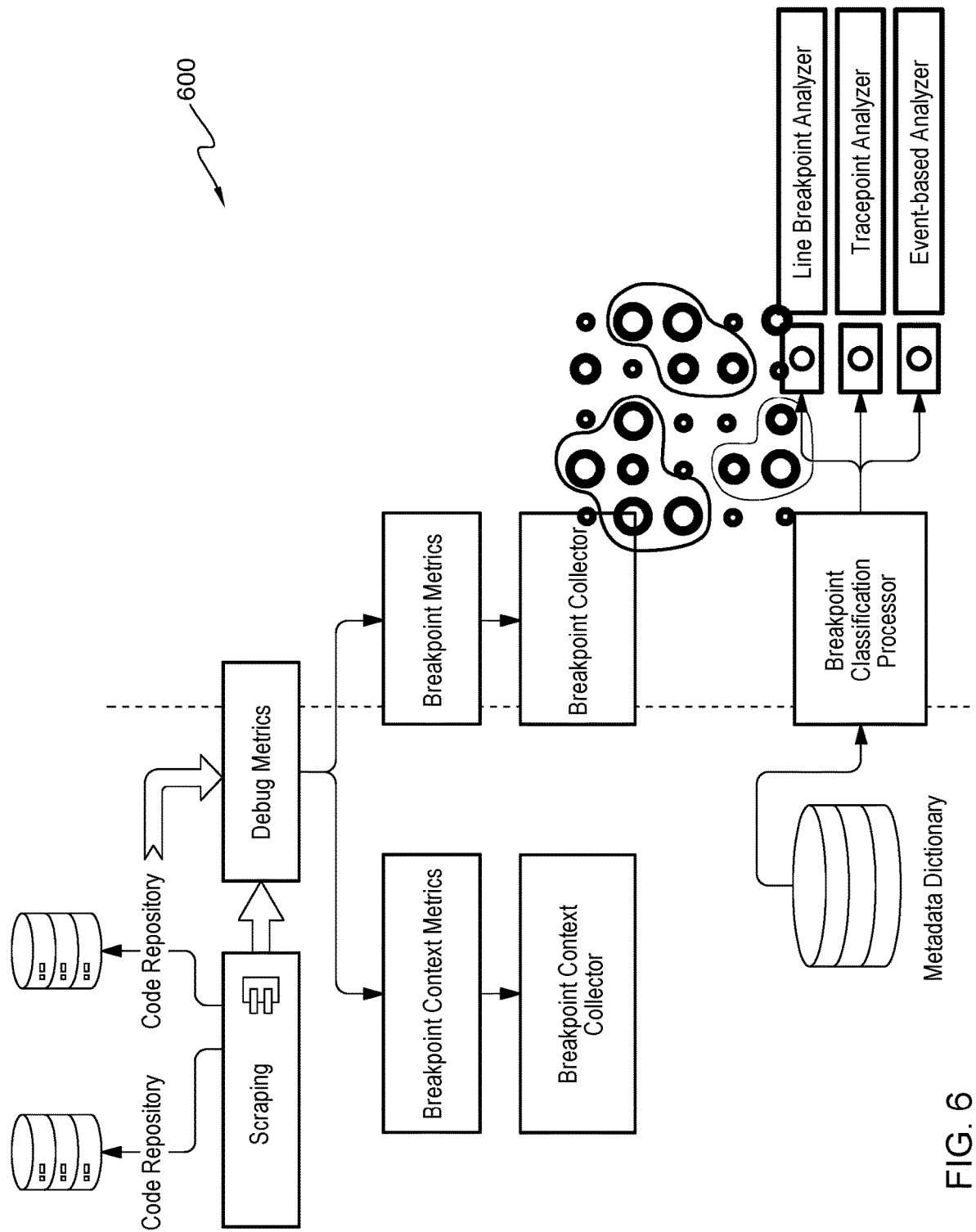
FIG. 6 is an illustration depicting breakpoint classification, in accordance with an illustrative embodiment of the present invention.

Program 150 classifies the breakpoints (step 208). In an embodiment, responsive to a plurality of identified breakpoints, breakpoint metrics, and contexts, program 150 categorizes the breakpoints and processes the breakpoints through multiple analyzers, including, but not limited to, line breakpoint analyzers, trace-point analyzers, and event-based analyzers. In an embodiment, program 150 utilizes a line breakpoint analyzer to group the breakpoints, wherein the line breakpoint analyzer groups by relative line positioning of breakpoints. In another embodiment, program 150 utilizes a trace-point analyzer that groups by utilized kernel hooks. In yet another embodiment, program 150 utilizes an event-based analyzer to group the breakpoints. In this embodiment, the event-based analyzer groups by events (i.e., null return, null pointers, error catching, specific function, specific system calls, etc.). For example, the event-based analyzer classifies, and groups based on exception breakpoints and associated errors/catches. In another embodiment, programs 150 classifies the breakpoints utilizing a knowledge base (KB). FIG. 6 further demonstrates step 208, specifically breakpoint classification.

Figure 7:
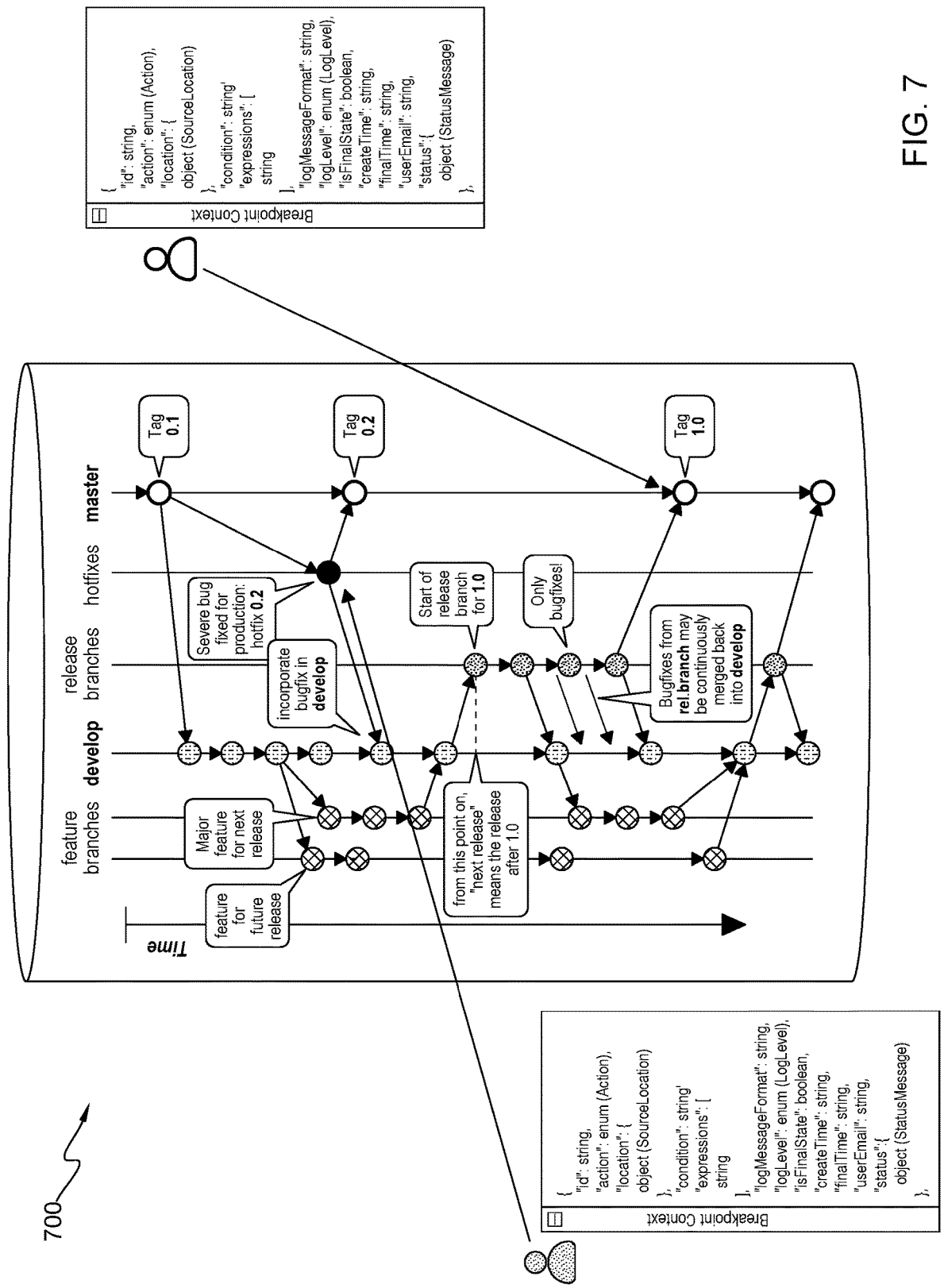
FIG. 7 is an illustration depicting resource binding, in accordance with an illustrative embodiment of the present invention.

Responsive to a plurality of classified breakpoints, program 150 associates and maps (i.e., resource binding) the classified breakpoints across a plurality of similar (i.e., within the same group or aggregation) source code repositories (i.e., forks, archived projects, etc.), branches, patches, and/or hotfixes. In an embodiment, program 150 utilizes respective breakpoint contexts to build breakpoint context relationships with repository source code (i.e., branches, forks, etc.) with similar breakpoint contexts. Responsive to a similar (e.g., over 50% similarity threshold) breakpoint context in one or more external repositories based on a breakpoint context relationship, program 150 calculates and compares respective function call chains to further determine breakpoint similarity. In this embodiment, program 150 compares respective function call chains to map classified breakpoints to similar code and repositories identified by a similar function call. In a further embodiment, program 150 pairs or maps different branches from a plurality of disparate repositories based on similar breakpoint contexts. In another embodiment, program 150 compares respective function call chains to map classified breakpoints to similar source code identified by a similar function call chain. FIG. 7 further demonstrates step 208, specifically resource binding.

Program 150 generates and pushes a debug chain (step 210). Responsive to one or more resource mapped breakpoints corresponding to one or more similar source code repositories, branches, patches, and/or hotfixes, program 150 creates a debug metric graph for each similar breakpoint based on breakpoint context and/or function call chain. In this embodiment, program 150 creates the debug metric graph with code, breakpoint type, and other related debug elements, where the graph represents multi-dimensional debug breakpoints and contexts for multi-tenant metrics. In this embodiment, the debug metric graph comprises a plurality of linked nodes that include condition keys (e.g., simulation variable name, runtime variable name, etc.), condition values (e.g., cache return value, computing cost, etc.), breakpoint type (e.g., exception (e.g., null pointer, etc.), unexpected value, fatal crash, etc.), breakpoint hierarchy (e.g., code blocks, code implementation hierarchy, interface definition, etc.), and activity frequency (e.g., frequency of events, trigger timing, etc.). In a further embodiment, the nodes are linked with mapped relationships between resource bound breakpoints and associated breakpoint contexts as weights (e.g., breakpoint/context similarity ratings, scores, or probabilities). In an embodiment, program 150 does not consider the debug metric graph as a single input but instead program 150 divides the metric graph into a plurality of metric blocks based on associated code hierarchy. In this embodiment, the metric block can be associated with or focused on a specific method, global variable, object, file, etc. In another embodiment, program 150 creates a feature matrix representing the multi-dimensional factors within the metric block without any correlation weight.

In various embodiments, program 150 utilizes a plurality of historical attribute matrices with associated correlations/weights to create and train GNN 152. In this embodiment, program 150 utilizes supervised learning methods to train GNN 152 to output breakpoint or debug chain recommendations responsive to an inputted metric graph, where a debug chain is a predicted sequence of breakpoints and associated breakpoint contexts. In an embodiment, program 150 leverages GNN 152 or a graph convolutional network (GCN) as a learning system to recommend one or more optimized breakpoint paths based on a created debug metric graph. In an embodiment, GNN 152 generates a debug chain or debug path comprising one or more breakpoints applicable to a target software project, repository, code snippet, or code element. In this embodiment, the debug chain comprises a plurality of breakpoints, associated breakpoint contexts, associated similarity scores or correlations, and respective positions of each breakpoint within the target source code (i.e., the target repository or code that a tenant is actively developing). In an embodiment, program 150 creates a debug chain comprising all breakpoints with associated correlations or weights exceeding a predetermined threshold (e.g., all breakpoints identified (e.g., identified through similar function call chains) in external repositories with a similarity or probability exceeding 75%). In this embodiment, the generated debug paths also comprise resource bindings with the external or disparate source code repository associated with the breakpoints comprised in the path.

Figure 8:
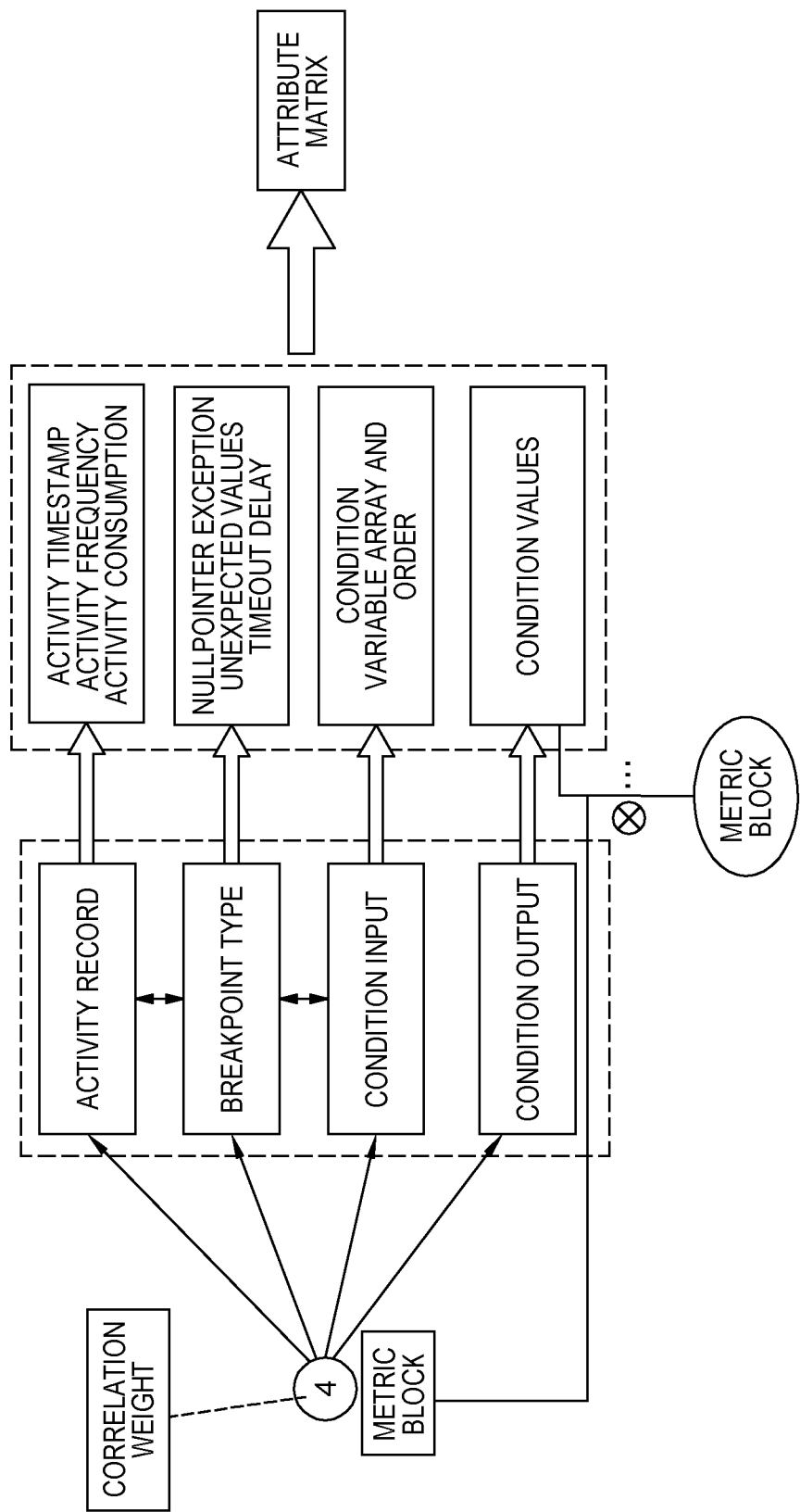
FIG. 8 is an illustration depicting debug chain generation, in accordance with an illustrative embodiment of the present invention.

In an embodiment, program 150 distributes and/or pushes the generated debug chain to multiple tenants. In another embodiment, program 150 deploys the generated debug chain to one or more repositories, wherein program 150 modifies the stored code to incorporate the debug chain. In this embodiment, program 150 maintains one or more generated variants of the generated debug chain, each with separated breakpoint chains specific to a variant (e.g., computing cost, targeted code elements, etc.). In various embodiments, program 150 modifies and presents existing code with the generated debug chain on a target software project or repository. In this embodiment, program 150 incorporates (e.g., adds, suggests, notifies the tenant) the debug chain within an integrated development environment (IDE). For example, as a tenant writes new code, program 150 actively monitors and ingests the new code dynamically adding or suggesting breakpoints within the graphical user interface of the IDE (e.g., underlining a section of code or element corresponding to a recommended breakpoint comprised in the generated debug chain). In this example, program 150 adds links to repositories with similar contexts. In a further embodiment, program 150 requests debug chain verification from the tenants and retrains GNN 152 responsive to the verification (e.g., positive, or negative). FIG. 8 further depicts step 210.

Figure 3:
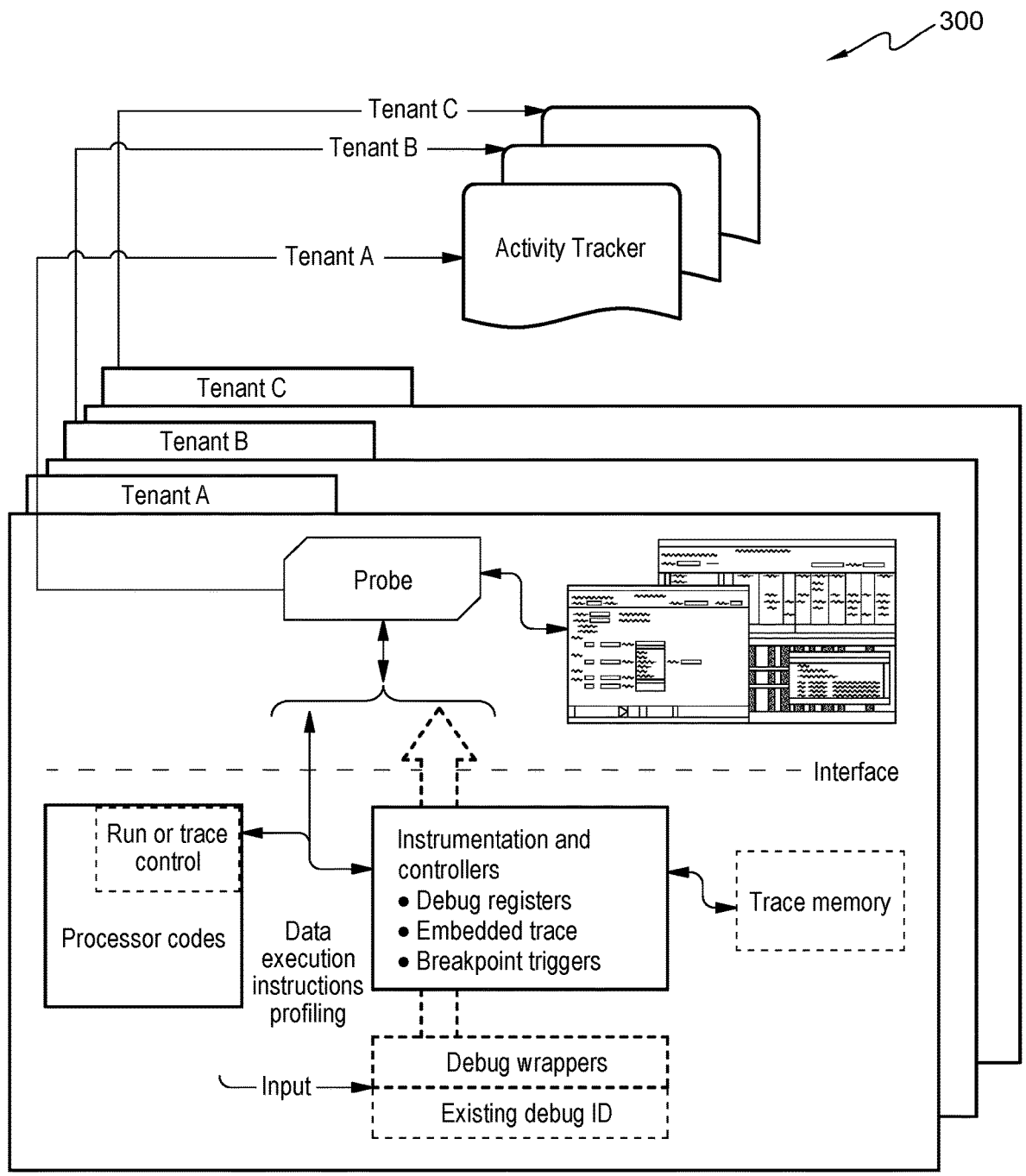
FIG. 3 is an illustration depicting an activity tracker, in accordance with an illustrative embodiment of the present invention.

FIG. 3 depicts activity tracker illustration 300, in accordance with an illustrative embodiment of the present invention. Activity tracker example 300 depicts an activity tracker recording and monitoring debug activities of a plurality of tenants through probing of system information including running/tracing processor cores, profiling data execution instructions, instrumentation, and controllers (e.g., debug registers, embedded traces, breakpoint triggers, and trace memory).

FIG. 4 depicts scraping illustration 400, in accordance with an illustrative embodiment of the present invention. Scraping illustration 400 depicts program 150 scraping debug activities into debug metrics by aggregating a plurality of disparate debug activities by code elements (i.e., statements, blocks, paths, functions, etc.).

FIGS. 5A and 5B depict debug metric splitting illustration 500, in accordance with an illustrative embodiment of the present invention. Debug metric splitting illustration 500 depicts program 150 creating breakpoint metrics by extracting breakpoint properties from the scraped debug metrics, where breakpoint properties include, but are not limited to, id, action, location, condition, expressions, state data, status of evaluated expressions, stack information, etc.). Additionally, debug metric spitting illustration 500 depicts program 150 collecting and constructing breakpoint context metrics through the construction of a function call chain.

FIG. 6 depicts breakpoint classification illustration 600, in accordance with an illustrative embodiment of the present invention. Breakpoint classification illustration 600 depicts program 150 categorizing the breakpoints and processing the breakpoints through multiple analyzers, including, but not limited to, line breakpoint analyzers, trace-point analyzers, and event-based analyzers.

FIG. 7 depicts resource binding 700, in accordance with an illustrative embodiment of the present invention. Resource binding 700 depicts program 150 associating and mapping (i.e., resource binding) the classified breakpoints across a plurality of similar source code repositories, branches, patches, and/or hotfixes. Program 150 utilizes respective breakpoint contexts to build breakpoint context relationships with repository source code. Additionally, program 150 pairs or maps different branches from a plurality of disparate repositories based on similar breakpoint context. Program 150 compares constructed function call chains to map classified breakpoints to similar source code identified by similar function call chains.

FIG. 8 depicts debug chain generation 800, in accordance with an illustrative embodiment of the present invention. Debug chain generation 800 comprises a debug metric graph further comprising a linked node that includes condition keys (e.g., simulation variable name, runtime variable name, etc.), condition values (e.g., cache return value, computing cost, etc.), breakpoint type (e.g., exception (e.g., null pointer, etc.), unexpected value, fatal crash, etc.), breakpoint hierarchy (e.g., code blocks, code implementation hierarchy, interface definition, etc.), and activity frequency (e.g., frequency of events, trigger timing, etc.). The nodes are linked with mapped relationships between resource bound breakpoints and associated breakpoint contexts as weights (e.g., breakpoint/context similarity ratings, scores, or probabilities). Program 150 divides the metric graph into a plurality of metric blocks based on associated code hierarchy. In another embodiment, program 150 creates an attribute matrix representing the multi-dimensional factors within the metric block without any correlation weight.

What is claimed is:

1. A computer-implemented method comprising:
generating, by one or more computer processors, a debug chain from one or more similar resource bound breakpoints, wherein the debug chain provides dynamic code flow, comprising:
constructing, by one or more computer processors, a function call chain for each breakpoint in the plurality of breakpoints;
resource binding, by one or more computer processors, the classified breakpoints across a plurality of similar source code repositories based on respective construction function call chain similarity, wherein resource binding maps breakpoints with similar source code repositories;
training, by one or more computer processors, a convolutional network with the resource bound breakpoints;
generating, by one or more computer processors, the debug chain utilizing the trained convolutional network; and
distributing, by one or more computer processors, the generated debug chain to one or more tenants.

2. The computer-implemented method of claim 1, wherein generating the debug chain from the one or more similar resource bound breakpoints further comprises:
monitoring, by one or more computer processors, a plurality of debug activities from a plurality of tenants;
scraping, by one or more computer processors, the plurality of debug activities into a plurality of debug metrics;
splitting, by one or more computer processors, the scraped debug metrics into a plurality of breakpoints and associated breakpoint contexts.

3. The computer-implemented method of claim 2, wherein the plurality of debug activities includes I. device identification, II. single stepping, III. breakpoints and watchpoints, and IV. access to static memory and I/Os.

4. The computer-implemented method of claim 2, wherein constructing the function call chain for each breakpoint in the plurality of breakpoints, comprises:

testing, by one or more computer processors, a set of test cases on a program associated with one or more source code repositories;

identifying, by one or more computer processors, a sequence of functions executed during the tested set of test cases; and constructing, by one or more computer processors, a matrix comprising the sequence of functions and associated test results.

5. The computer-implemented method of claim 1, further comprises:

training, by one or more computer processors, a graph neural network with the resource bound breakpoints.

6. The computer-implemented method of claim 1, wherein distributing the generated debug chain to the one or more tenants, comprises:

modifying, by one or more computer processors, a source code repository with the generated debug chain.

7. The computer-implemented method of claim 1, further comprising:

incorporating, by one or more computer processors, the generated debug chain within an integrated development environment.

8. A computer program product comprising:

one or more computer readable storage media and program instructions stored on the one or more computer readable storage media, the stored program instructions comprising:

program instructions to generate a debug chain from one or more similar resource bound breakpoints, wherein the debug chain provides dynamic code flow, wherein the program instructions further comprise:

program instructions to construct a function call chain for each breakpoint in a plurality of breakpoints;

program instructions to resource bind the breakpoints across a plurality of similar source code repositories based on respective constructed function call chain similarity, wherein resource binding maps breakpoints with similar source code repositories;

program instructions to train a copnvolutional network with the resource bound breakpoints;

program instructions to generate the debug chain utilizing the trained convolutional network; and program instructions to distribute the generated debug chain to one or more tenants.

9. The computer program product of claim 8, wherein the program instructions to generate the debug chain from the one or more similar resource bound breakpoints, comprise:

program instructions to monitor a plurality of debug activities from a plurality of tenants;

program instructions to scrape the plurality of debug activities into a plurality of debug metrics;

program instructions to split the scraped debug metrics into a plurality of breakpoints and associated breakpoint contexts.

10. The computer program product of claim 9, wherein the plurality of debug activities includes I. device identification, II. single stepping, III. breakpoints and watchpoints, and IV. access to static memory and I/Os.

11. The computer program product of claim 9, wherein the program instructions to construct the function call chain for each breakpoint in the plurality of breakpoints, comprise:

program instructions to test a set of test cases on a program associated with one or more source code repositories;

program instructions to identify a sequence of functions executed during the tested set of test cases; and program instructions to construct a matrix comprising the sequence of functions and associated test results.

12. The computer program product of claim 8, wherein the program instructions, stored on the one or more computer readable storage media, further comprise:

program instructions to train a graph neural network with the resource bound breakpoints.

13. The computer program product of claim 8, wherein the program instructions to distribute the generated debug chain to the one or more tenants, comprise:

program instructions to modify a source code repository with the generated debug chain.

14. The computer program product of claim 8, wherein the program instructions, stored on the one or more computer readable storage media, further comprise:

program instructions to incorporate the generated debug chain within an integrated development environment.

15. A computer system comprising:

one or more computer processors;

one or more computer readable storage media; and program instructions stored on the computer readable storage media for execution by at least one of the one or more processors, the stored program instructions comprising:

program instructions to generate a debug chain from one or more similar resource bound breakpoints, wherein the debug chain provides dynamic code flow, wherein the program instructions further comprise:

program instructions to construct a function call chain for each breakpoint in a plurality of breakpoints;

program instructions to resource bind the classified breakpoints across a plurality of similar source code repositories based on respective construction function call chain similarity, wherein resource binding maps breakpoints with similar source code repositories;

program instructions to train a convolutional network with the resource bound breakpoints;

program instructions to generate the debug chain utilizing the trained convolutional network; and program instructions to distribute the generated debug chain to one or more tenants.

16. The computer system of claim 15, wherein the program instructions to generate the debug chain from the one or more similar resource bound breakpoints, comprise:

program instructions to monitor a plurality of debug activities from a plurality of tenants;

program instructions to scrape the plurality of debug activities into a plurality of debug metrics;

program instructions to split the scraped debug metrics into a plurality of breakpoints and associated breakpoint contexts.

17. The computer system of claim 16, wherein the plurality of debug activities includes I. device identification, II. single stepping, III. breakpoints and watchpoints, and IV. access to static memory and I/Os.

18. The computer system of claim 16, wherein the program instructions to construct the function call chain for each breakpoint in the plurality of breakpoints, comprise:

program instructions to test a set of test cases on a program associated with one or more source code repositories;

program instructions to identify a sequence of functions executed during the tested set of test cases; and program instructions to construct a matrix comprising the sequence of functions and associated test results.

19. The computer system of claim 15, wherein the program instructions, stored on the one or more computer readable storage media, further comprise:
- program instructions to train a graph neural network with the resource bound breakpoints.

20. The computer system of claim 15, wherein the program instructions to distribute the generated debug chain to the one or more tenants, comprise:
- program instructions to modify a source code repository with the generated debug chain.

* * * * *